Sept. 17, 1968  A. W. GEBAUER  3,401,455
PORTABLE PRUNING EQUIPMENT
Filed June 15, 1966  5 Sheets-Sheet 1
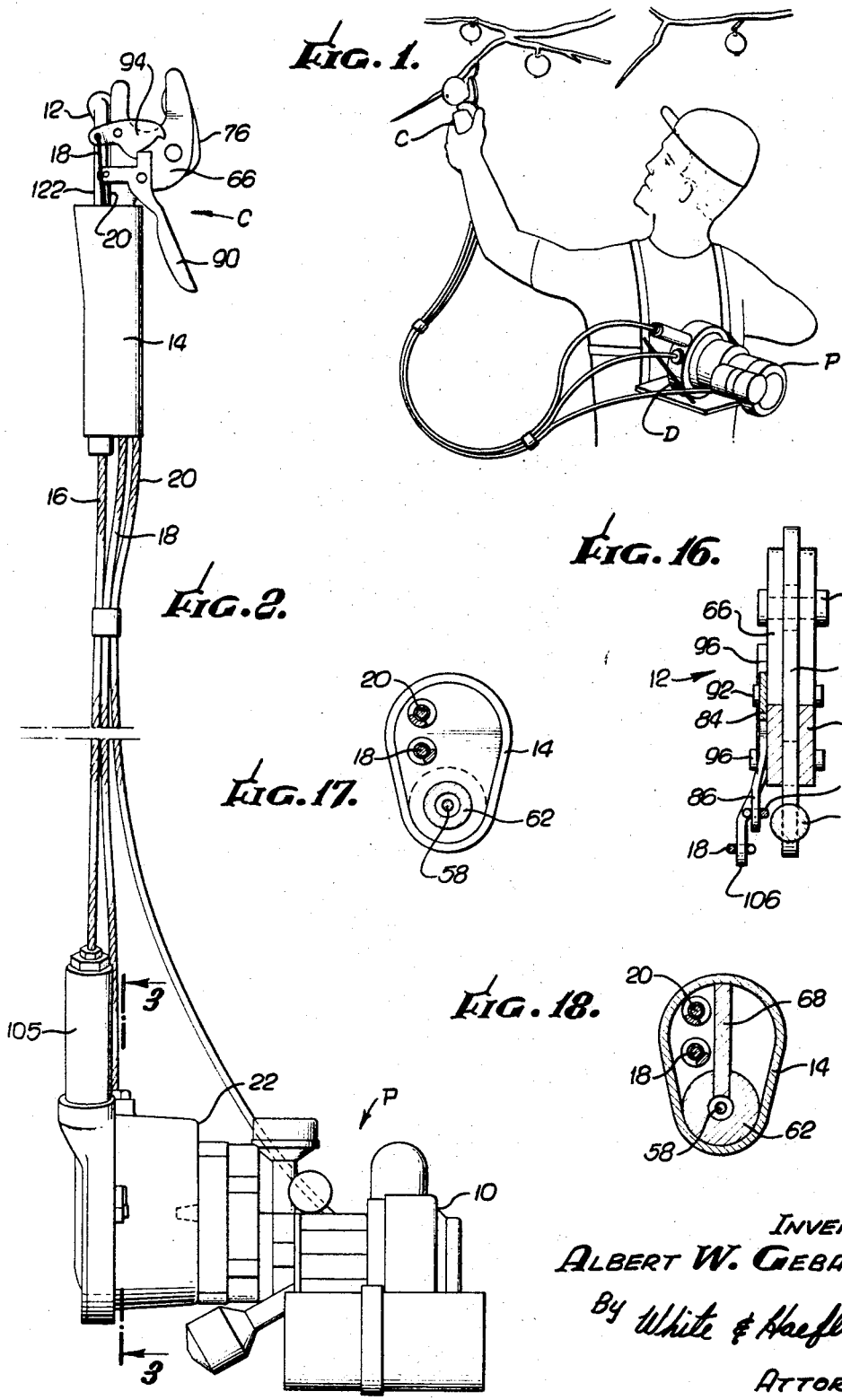
INVENTOR.
ALBERT W. GEBAUER
BY White & Haefliger
ATTORNEYS.

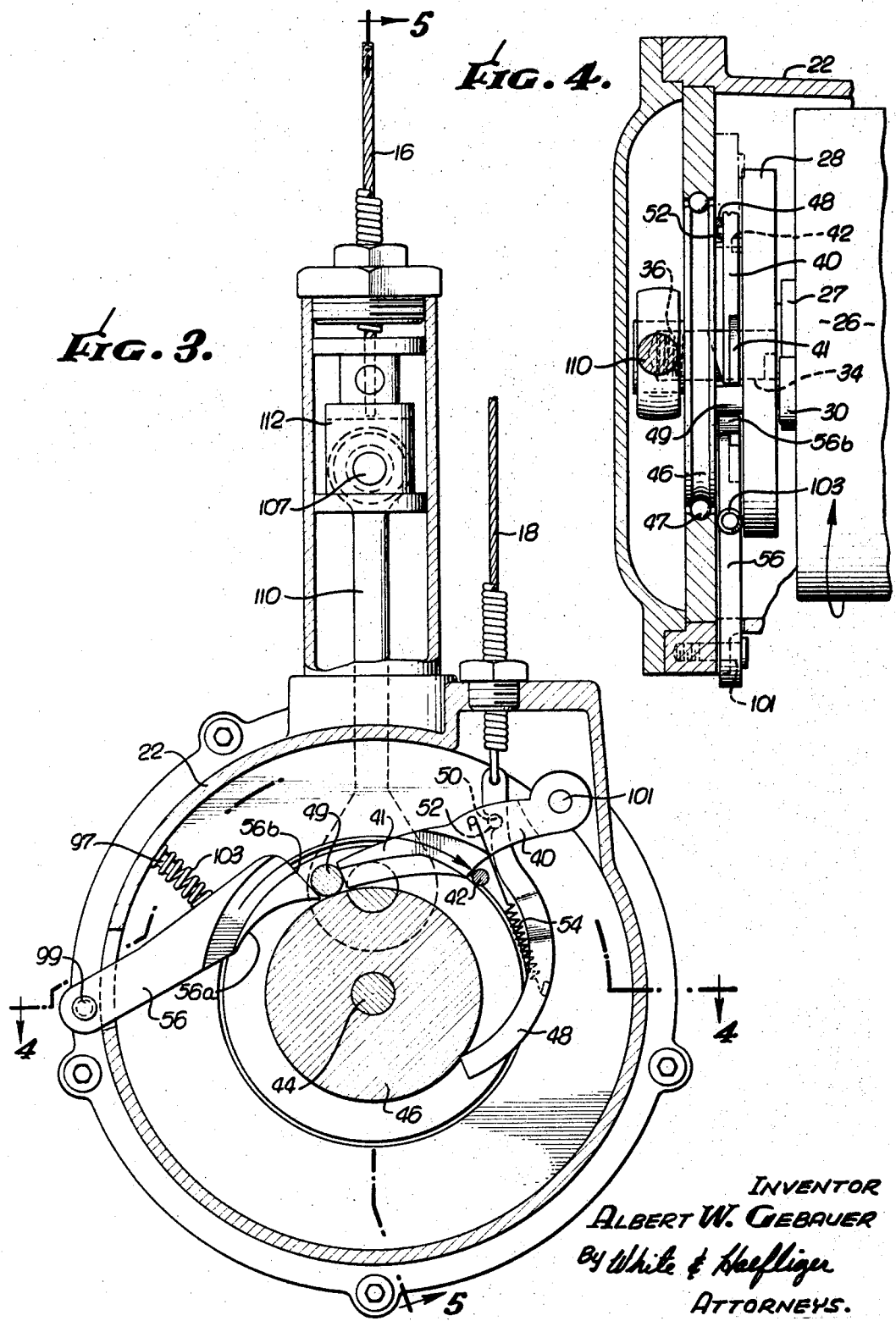

Sept. 17, 1968  A. W. GEBAUER  3,401,455
PORTABLE PRUNING EQUIPMENT
Filed June 15, 1966  5 Sheets-Sheet 3
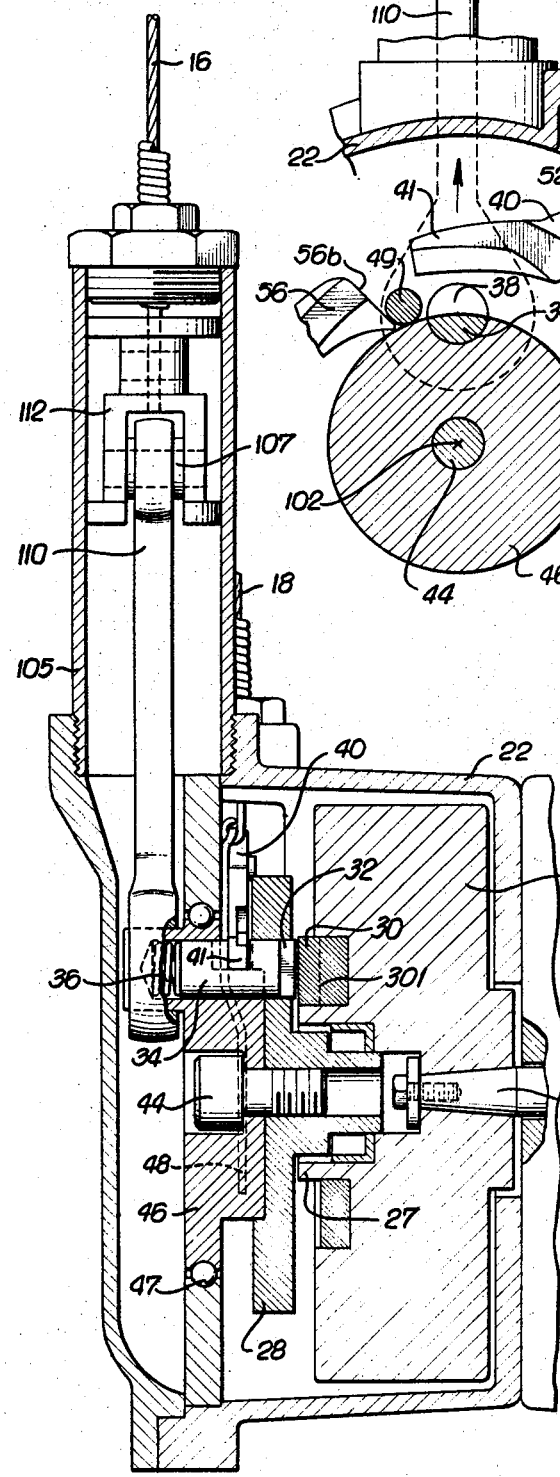
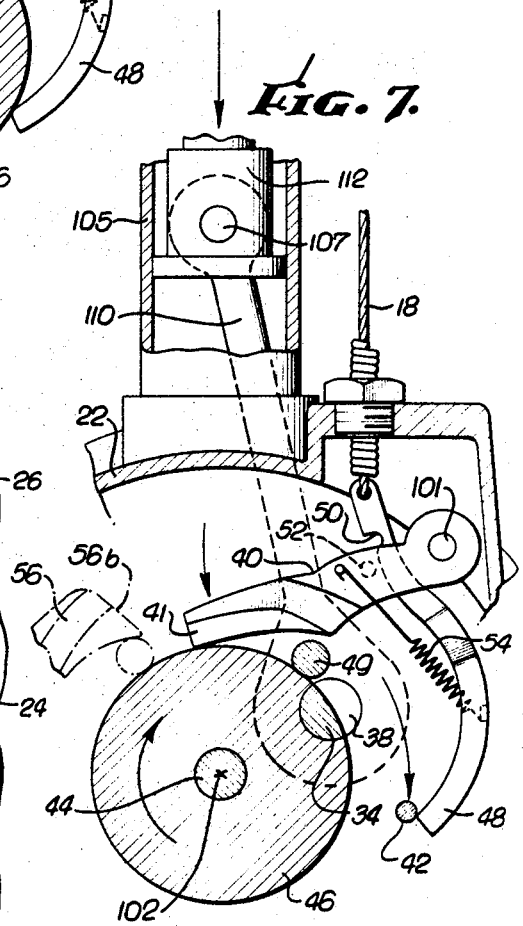
INVENTOR.
ALBERT W. GEBAUER
By White & Haefliger
ATTORNEYS.

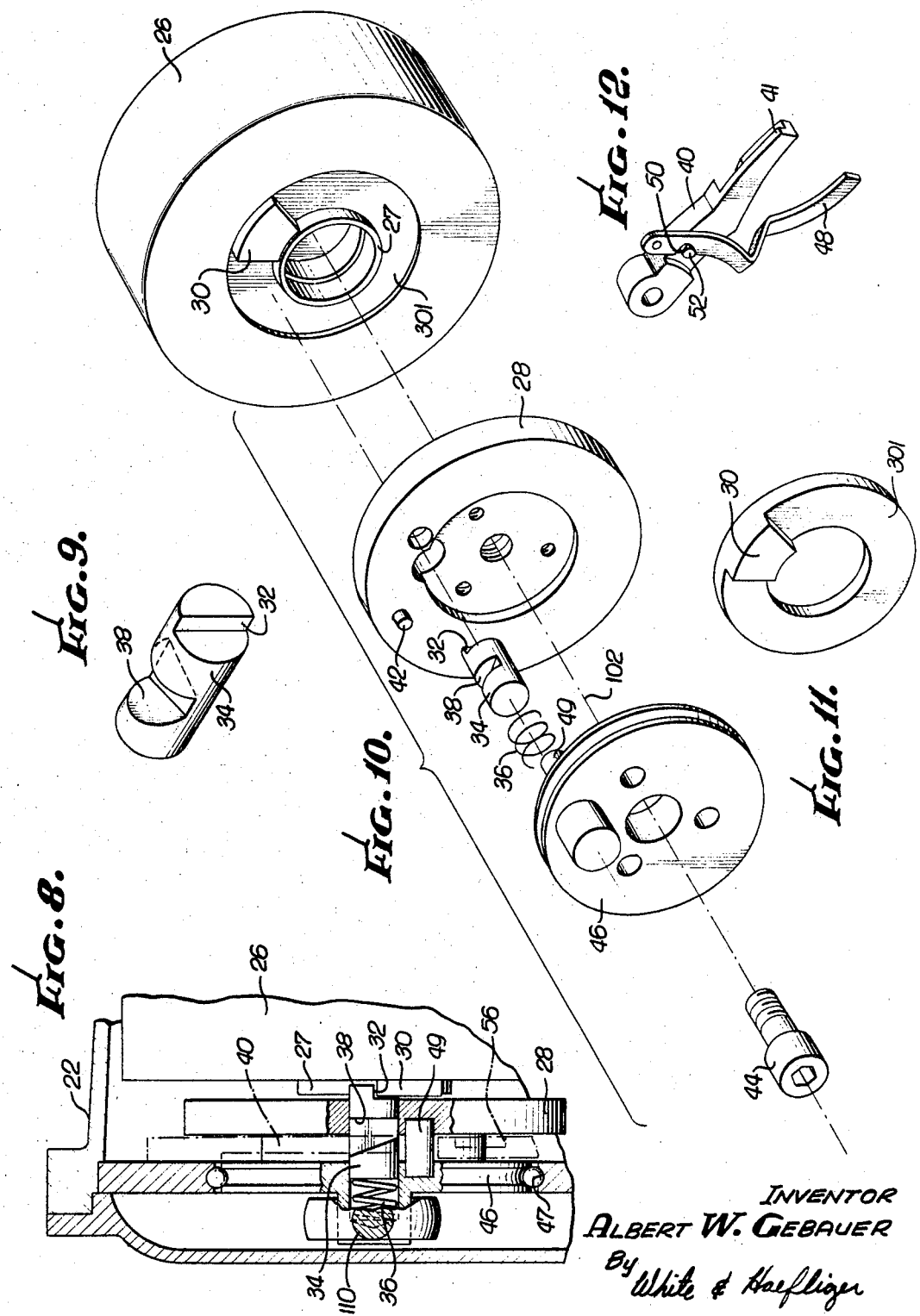

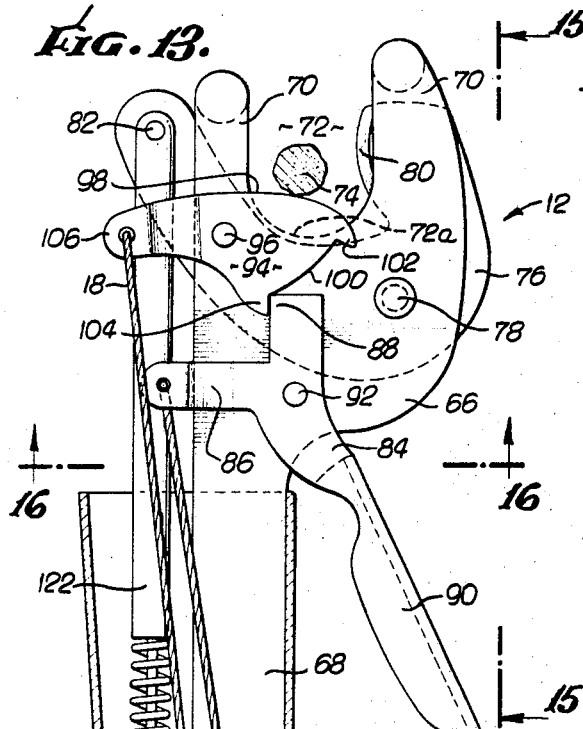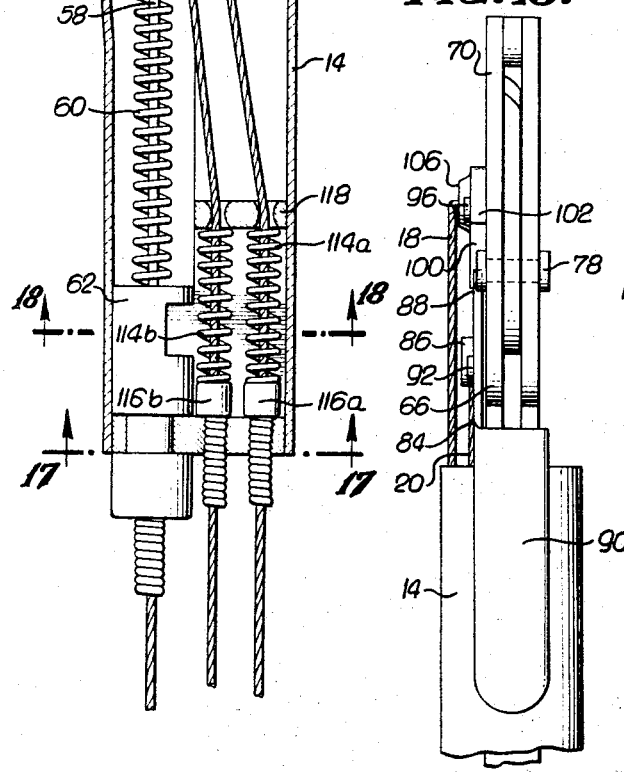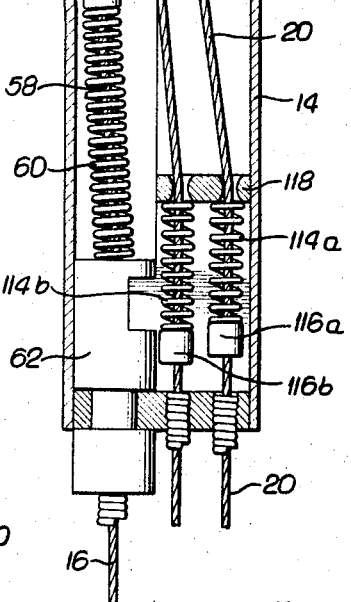

United States Patent Office 3,401,455
Patented Sept. 17, 1968

3,401,455
PORTABLE PRUNING EQUIPMENT
Albert W. Gebauer, Denver, Colo., assignor to Scientific Separators, Inc., Denver, Colo., a corporation of Colorado
Filed June 15, 1966, Ser. No. 557,722
15 Claims. (Cl. 30—228)

ABSTRACT OF THE DISCLOSURE

The disclosure concerns a pruning tool having a power source, a remote pruning head, and means including a trigger responsive to presentation of the head to a prunable stalk and to operation of a manual control to effect powered severing of the stalk.

The present invention relates to an improved cutting tool having a power source and remote cutting head. More particularly, the invention relates to a cutting tool adapted for use in areas remote to utilities, such as vinyards, orchards, nurseries and the like for a variety of cutting or severing tasks such as tree, vine and bush pruning and suckering of corn.

Cutting tools for pruning and like operations are known. Powered cutting tools are, of course, well known. Powered pruning tools constitute a desirable advance in the art; however, operators of these devices are typically unskilled, and irregular terrain and obstructed vision combine with low skill levels to generate considerable hazard to the worker and liability risk to the grower. There is a need for a powered pruning tool having operating features such as a remote, easily used cutting head and portable power source. In addition, importantly, there is a need for a powered pruning tool having safety features conducive to injury free operation.

It is an object of the present invention to provide an improved cutting tool.

It is another object to provide a cutting tool useful in severing, pruning and like cutting operations affording ease of operation, maximum portability and minimum risk of injury to the operator.

It is another object to provide method of performing cutting, severing, pruning and like operations with minimal risk of injury to the operator.

In general, safe and improved cutting apparatus operation is achieved in accordance with the present invention by requiring two simultaneous conditions to exist prior to any cutting stroke. One condition is that the hand of the operator be on the drive control. The other condition is that the object to be cut be in the cutter path.

In broad terms the invention provides a cutting tool comprising a cutting head, a cutter supported at the head to cut work presented to the head, a drive for operating the cutter, a manual control for the drive and means responsive to presentation of the cutter to the work and movement of the manual control in unblocking relation to drive transmission to the cutter for effecting operation of the drive to actuate the cutter.

Safe cutting is accomplished by presenting work to be cut to a cutting zone, pressing the work against a pressure responsive element protruding into the zone, maintaining a cutting surface adjacent the cutting zone actuatable by displacement of the pressure responsive element, selectively opposing and permitting displacement of the pressure responsive element by pressure of work to be cut; displacement being selected coincident with delivery of power to the cutting surface.

Other objects of the invention include the provision of clutch means operable to transmit drive from the power source for transmission of a single stroke to the cutter; the provision of a clutch pin carried eccentrically on a rotary clutch part to rotate therewith and also to move toward engagement with a rotating power source following release of the pin by a pawl, such release being controlled by a trigger displaceable by the work; for manual control that must be hand operated in order to enable work displacement of the trigger.

The tool described herein is particularly well adapted to cutting operations wherein elongated relatively small diameter organic, particularly cellulosic objects such as plant, tree and vine appendages, e.g. branches, limbs and stems are to be severed. The apparatus is not limited, however, to such operations but rather is useful wherever work responsive, remote powered cutting is desired, preferably cutting that can be accomplished with a single stroke, although multiple stroke cutting is within the scope of the present invention.

These and other objects and advantages of the invention, as well as the details of illustrative embodiments, will be more fully understood from the following specific description of the drawings, in which:

FIG. 1 is a schematic view showing one embodiment of the present invention;

FIG. 2 is a view showing the apparatus in enlarged side elevation;

FIG. 3 is an enlarged section on line 3—3 in FIG. 2, showing the drive mechanism in position following completion of the cutting stroke;

FIG. 4 is a cross section of broken line 4—4 in FIG. 3 showing the clutch pin out of engagement;

FIG. 5 is a cross section with certain of the parts appearing in elevation on line 5—5 of FIG. 3;

FIG. 6 is a fragmentary section similar in part to FIG. 3 showing the pawl in changed position;

FIG. 7 is similar to FIG. 6, showing the drive mechanism during the cutting stroke;

FIG. 8 is a fragmentary showing similar to FIG. 4 with certain of the parts appearing in section to expose the clutch pin in engagement;

FIG. 9 is an isometric view of the clutch pin;

FIG. 10 is an exploded isometric view of the clutch mechanism;

FIG. 11 is an isometric view of the clutch plate;

FIG. 12 is an isometric view of the drive mechanism pawl and cam follower;

FIG. 13 is a side elevation, partly in section, showing the cutting head and associated connectors of the cutting assembly, prior to cutting stroke;

FIG. 14 is a side elevation, showing the cutting head and associated connectors of the cutting assembly at maximum advancement during the cutting stroke;

FIG. 15 is a fragmentary rear elevation taken on line 15—15 in FIG. 13;

FIG. 16 is a cross section of the cutting head on line 16—16 in FIG. 13;

FIG. 17 is a cross section on line 17—17 in FIG. 13;

FIG. 18 is a cross section on line 18—18 in FIG. 13.

The invention will be described first with reference to structure and thereafter operation of the structure will be described.

Structure

Referring now to the drawings in detail, FIG. 1 depicts a pruning operation illustrating the advantages of the present invention. A power source, P conveniently strapped to the back of the worker, working through drive assembly D powers cutting assembly C which is readily manipulated with one hand, with complete safety.

In FIG. 2, the general arrangement of parts is shown including cutting assembly C having cutting head 12, a hand grip 14 adjacent thereto, various connectors being cables or rods (if flexibility is not required) identified as 16, 18 and 20, the function of which is described below, and power source P including motor 10 and housing 22. Any power source, capable of providing sufficient energy to drive the cutting mechanism can be used. Motor 10 is generally either electrically driven (including battery) or fuel powered. Among the latter kerosene, gasoline and liquefied petroleum gas (LPG) powered motors are preferred.

The drive assemby D is generally shown in FIGS. 3–5. Referring to FIGS. 3 and 5 particularly, there is shown a housing 22 in which the drive shaft 24 of motor 10 is journaled. Drive means are provided for selectively transmitting power to the cutter along drive connector 16. The drive means as shown comprises a power source, here flywheel 26, fixed to the end of drive shaft 24, a coupler part 28 coaxial with the drive shaft 24, spaced from flywheel 26 by collar 27 and cooperating clutch means on opposed faces of the coupler part 28 including clutch plate 301 press fitted in flywheel 26 and having clutch lug 30 (FIG. 11) and the terminus 32 of eccentric clutch pin 34 journaled in part 28. Clutch pin 34, biased toward clutch plate 301 by spring 36, is provided with tapered keyway 38 (FIG. 9) which is adapted to receive pawl 40.

Coupler part 28 is provided with a cam lug 42 on its face remote to flywheel 26. Secured to part 28 by bolt 44 is coupler bearing 46 journaled at 47 in housing 22. Clutch pin 34 is journaled in bearing 46 and extends between the bearing and part 28. Pin 49 (FIG. 8) extends between coupler part 28 and coupler bearing 46 to prevent relative rotational motion of these elements. Clutch pin 34 is adapted to engage clutch lug 30 by axial movement (urged by spring 36) and disengage by a reverse movement. Engagement of clutch pin 34 and clutch lug 30 imparts through clutch plate 301 the rotative motion of flywheel 26 to coupler part 28 and coupler bearing 46.

Reverse movement of clutch pin 34 is accomplished by pawl 40 having a shoulder 41 tracking in keyway 38 of clutch pin 34. Pressure of pawl 40 in the narrowing keyway 38 cams clutch pin 34 axially away from clutch lug 30 on clutch plate 301 and thus from flywheel 26 terminating engagement of terminus 32 of clutch pin 34 and clutch lug 30.

Pawl 40 is pivotally mounted at 101 in housing 22 so that shoulder 41 is tangentially disposed with respect to the path of travel of clutch pin 34. Cooperating with pawl 40 is cam follower 48 pivotally secured to trigger connector 18 and having notch 50 adapted to releasably retain pin 52 projecting from the transversely disposed pawl 40. A tension spring 54 interconnects the pawl 40 and follower 48 to urge the pawl shoulder 41 counterclockwise toward axis 102 in FIG. 7, and to urge the follower 48 clockwise toward that axis. Locking tongue 56 pivotally mounted on housing 22 at 99 is biased toward axis 102 by compression spring 103 retained by boss 97 on housing 22 to resist counterclockwise movement of coupler part 28, bearing 46 and clutch pin 34. Alternatively a brake band in peripheral frictional contact with part 28 can be used preferably tensioned by springs to resist rotation of coupler part 28, bearing 46 and clutch pin 34.

Leading from drive assembly D to cutting assembly C are drive, trigger and control connectors 16, 18 and 20 respectively. These connectors extend through hand grip 14, as shown in FIGS. 17 and 18. Drive connectors 16 typically comprises wire 58 extending within return spring 60, retained between stay 62 and drive connector shank 122.

Drive connector 16 extends into cylinder 105 (FIG. 5) and is there secured to slide 112 axially movable within the cylinder 105. Slide 112 is connected at pin 107 to crank 110 which, at its other end, is journaled on clutch pin 34. Return spring 60 is typically compressed by actuation of the cutter, (FIG. 14) and continually urges the cutter toward its position as seen in FIG. 13. Trigger connector 18 and control connector 20 are typically similar in construction to drive connector 16 and are positioned to extend within hand grip 14.

The cutting assembly C is best shown in FIGS. 13–16. Referring to FIGS. 13 and 14 particularly, there is shown cutting means comprising the cutting head 12 composed of frame 66 rigidly fixed with respect to hand grip 14 by shank 68 and having arms 70 defining a work-receiving cutting zone 72 adapted to receive work such as vine branch 74. A cutter blade 76 is pivotally mounted on the frame 66 by pin 78 in a manner such that by relative pivotal movement of blade 76 and arm 70 at least a portion of blade 76 traverses the work-receiving cutting zone 72 in an oscillatory movement. Cutting edge 80 is provided on the cutting zone traversing portion of blade 76. Blade 76 is secured to drive connector 16 at pin 82, whereby axial motion of wire 58 of drive connector 16 induces pivotal movement of blade 76 about pin 78 and cutting edge 80 traverses cutting zone 72. An additional cutting surface can be provided at 72a by providing a sharp edge there cooperative with cutting surface 80 of blade 76.

Power supplied to drive connector 16 from motor 10 through drive D is regulated by manual control 84 having an arm 86, shoulder 88, and handle 90 which is pivotally mounted on frame 66, conveniently on a side thereof remote to blade 76, at fulcrum pin 92. Control 84 is designed to increase power supplied upon narrowing of the angle between the handle 90 and hand grip 14. Return spring 114a around connector 20 and held between collar 116a fixed to connector 20 and shoulder 118 of hand grip 14, opposes movement of control 84 (and urges control 84 to the off position upon release of pressure on handle 90) to permit trigger 94 to be displaced from cutting zone 72 by pressing against vine branch 74. Trigger 94 is provided with a tongue 106 connected by trigger connector 18 to cam follower 48. Each displacement of trigger 94 to FIG. 14 position is opposed by return spring 114b held between collar 116b fixed to connector 18 and shoulder 118 of hand grip 14. The minimum and maximum compression of return spring 114b are shown in FIGS. 13 and 14 respectively.

An important aspect of the present invention is the actuation of blade movement in response to the presentation of work in the cutting zone. This work actuation is achieved by the provision of pressure displaceable trigger 94 pivotally mounted on frame 66 at pin 96, on the same frame side as control 84. Trigger 94 is spring biased to project one work bearing surface 98 into the cutting zone 72. An arcuate locking surface 100 between ears 102 and 104 is also provided on trigger 94 adapted to bear against shoulder 88 of control 84. Shoulder 88 and surface are relatively spaced so that rotation of control 84 in the manner increasing power of the drive D (toward hand grip 14) is required.

*Operation*

The structure of one embodiment of the invention having been described in conjunction with the attached drawings primarily with reference to FIGS. 3, 5 and 13, the operation of this embodiment will now be described with reference particularly to FIGS. 4, 6, 7 and 8, and 14, showing movement of the parts.

Operation is begun by depressing handle 90 on control lever 84. This increases power supplied by drive assembly D which at the start is not in engagement with cutting assembly C. Flywheel 26 is driven at a suitable r.p.m. depending on the extent of depression of handle 90. The operator grasps handle grip 14 properly to actuate handle 90. Thus the hand nearest the cutting zone is engaged in an operation critical to cutting action and is out of harm's way. Work 74 is presented between arms 70 of the cutting head 12. Bearing surface 98 of trigger 94 engages the work 74 and force is exerted thereby to pivot trigger 94 around pin 96. Referring to FIG. 14, shoulder 88 has been pivoted around pin 92 by the depression of handle 90 by the operator. Otherwise (FIG. 13), shoulder 88 bears against locking surface 100 of trigger 94 and engages ear 102 preventing pivotal downward movement of the trigger, thereby precluding cutting action, as will be explained. Handle 90 having been first depressed, however, and shoulder 88 having thus been pivoted out of trigger pivot blocking relation with surface 100, the relative positions of trigger 94 and shoulder 88 are as shown in FIG. 14. Work 74 has pivoted trigger 94 downward. Tongue 106 has been commensurately pivoted upward producing an upward displacement of trigger connector 18.

In the drive mechanism, the upward movement of trigger connector 18 results in lifting pawl 40 from the position shown in FIG. 3 to the position shown in FIG. 6. This lifting of pawl 40 from keyway 38 permits clutch pin 34 to be displaced by the force of spring 36 through opening 108 in coupler part 28. Clutch pin terminus 32 now projects between rotating flywheel 26 and stationary coupler part 28. Clutch lug 30 engages terminus 32. After an initial inertial slippage due to frictional resistance to rotative motion, clutch plate 301 fitted in flywheel 26 rotates with part 28 at the r.p.m. of the flywheel 26. FIGURES 4 and 8 show the positions of clutch pin 34 in and out of engagement with clutch lug 30. In FIG. 4 spring 36 is compressed; pawl 40 is keyed in keyway 38 of the clutch pin 34; and flywheel 26, with press fitted clutch plate 301 and coupler part 28 are not engaged. In FIG. 8, pawl 40 has been displaced from keyway 38 by the upward force of lever 48 at notch 50 on pin 52 of pawl 40; spring 36 is expanded, urging clutch pin 34 through part 28 and into the space between clutch plate 301 and part 28; and clutch lug 30 is shown engaged with clutch pin terminus 32. Flywheel 26 and coupler part 28 are thus in engagement. Following such engagement, cam lug 42 is carried around the axis 102 during coupler rotation. In so moving, cam lug 42 forces cam follower 48 radially outward. This movement increases tension in spring 54 which urges pawl shoulder 41 laterally inward and into tangency with the path of keyway 38 in clutch pin 34 as seen in FIG. 7. Movement of pin 49 about the axis 102 lifts locking tongue 56 by bearing along surface 56a of tongue 56. After passage of pin 49 locking tongue 56 drops behind it to oppose retrogressive or "backlash" movement of coupler part 28 and coupler bearing 46 by engaging pin 49 with shoulder 56b of tongue 56.

Journaled on eccentric clutch pin 34 is crank 110 which is adapted through slide 112 in cylinder 105 to translate the rotary motion of coupler part 28 and pin 34 into axial reciprocal motion of wire 58 of drive connector 16. Crank 110 in one cycle moves wire 58 through one reciprocal action. Wire 58 (drive connector 16) is secured to blade 76. Reciprocal motion of wire 58 causes blade 76 to pivot around pin 78, cutting edge 80 traverses cutting zone 72 and work 74 is severed (FIG. 14). Completion of the reciprocatory motion of wire 58 returns blade 76 to the position shown in FIG. 13 ready for the cutting cycle to begin again.

Single stroke cutting action is provided in the embodiment shown in the drawings. Tension in spring 54 draws pawl 40 into the path of clutch pin 34. Keyway 38 receives pawl 40. The taper in keyway 38 cooperates with pawl 40 to cam clutch pin 34 away from clutch lug 30 disengaging cam 78 and clutch plate 301 in flywheel 26. Locking tongue 56 operates to prevent contracycle movement following the cycle. At the completion of the cutting stroke pawl 40 and locking tongue 56 are in the position shown in FIG. 3. A new cycle is begun by lifting pawl 40 to the position shown in FIG. 6 by movement of cam follower 48 in response to work pressure on trigger 94.

While certain embodiments of my invention have been hereinabove described for the purpose of illustration it should be understood that various modifications and adaptations thereof may be made within the spirit of the invention as set forth in the following claims.

What is claimed is:

1. Cutting tool suitable for pruning and the like comprising:

(a) a cutting head including a cutter supported at the head to cut work presented thereto;
(b) a drive for operating the cutter;
(c) a manual control for the drive; and,
(d) means including a trigger at the head responsive to presentation of the cutter head and trigger to the work and to movement of the manual control for effecting operation of the drive to operate the cutter, the trigger being located for displacement by the work when the manual control is moved out of blocking relation to the trigger.

2. The tool as claimed in claim 1, wherein said means for effectuating operation of the drive includes a rotating power source and clutch means operable to transmit drive from said source for transmission of a single stroke to the cutter.

3. The tool as claimed in claim 2, wherein the clutch means includes a rotary coupler part operatively connected to the cutter, and means carried by said part to engage the rotating power source.

4. The tool as claimed in claim 3 wherein means are provided on the rotating power source for engaging the rotary coupler including a clutch plate having a clutch lug frictionally resistant to rotative motion coaxially coupled with the rotating power source.

5. Cutting tool suitable for pruning and the like comprising:

(a) a cutting head including a cutter supported at the head to cut work presented thereto;
(b) a drive for operating the cutter;
(c) a manual control for the drive; and
(d) means responsive to presentation of the cutter head to the work and to movement of the manual control for effecting operation of the drive to operate the cutter, said means including a rotating power source and clutch operable to transmit drive from said source for transmission of a single stroke to the cutter, the clutch means including a rotary coupler part operatively connected to the cutter, and means carried by said part to engage the rotating power source, the coupler having an axis of rotation and the engaging means comprising a clutch pin disposed eccentrically with respect to said axis to rotate with said coupler part and movable toward engagement with the rotating power source.

6. The tool as claimed in claim 5 wherein said means for effecting operation of the drive includes a spring urging the pin toward engagement with the power source, and a pawl movable out of blocking relation to said pin movement.

7. A tool as claimed in claim 6 wherein said means for effecting operation of the drive includes structure to move the pawl out of said blocking relation to said pin movement and also to urge the pawl toward camming engagement with the pin to retract the pin out of engagement with the power source in response to rotation of the coupler part to effect transmission of a single stroke to the cutter.

8. Tool claimed in claim 7 wherein the pawl is pivotally mounted and has a cam surface generally tangentially disposed with respect to the path of rotation of the clutch pin.

9. Tool claimed in claim 6, wherein said means for effecting operation of the drive includes trigger means positioned for displacement by the work upon application of the cutting head to work thereby to effect said clutch pin movement.

10. Tool claimed in claim 9, including a connection operable by the trigger means to displace the pawl out of engagement with the clutch pin and locking means to prevent rotation of the clutch pin in more than one direction.

11. Tool claimed in claim 10 wherein the manual control extends in blocking relation to the trigger means and is manually movable out of said blocking relation.

12. Tool claimed in claim 11 wherein the cutting head is recessed to form a cutting zone to receive work presented to the head.

13. Tool claimed in claim 12 wherein the cutter comprises a blade pivotally mounted to traverse the cutting zone.

14. Tool claimed in claim 13 wherein the blade is operatively connected to said coupler part for reciprocal pivotal movement.

15. Tool claimed in claim 13 wherein the trigger means and manual control are pivotally mounted on the cutting head and spaced for movement into and out of blocking engagement with one another.

References Cited

UNITED STATES PATENTS

| | | | |
|---|---|---|---|
| 2,228,635 | 1/1941 | Magennis | 30—228 |
| 1,838,186 | 12/1931 | Moodhe | 30—272 |
| 3,097,430 | 7/1963 | Lewinski et al. | 30—273 |
| 3,147,548 | 9/1964 | Aspeek | 30—272 |
| 3,213,605 | 10/1965 | Weldon | 30—228 |

ROBERT C. RIORDON, *Primary Examiner.*

J. C. PETERS, *Assistant Examiner.*